US008915456B2

(12) United States Patent
Burdsall et al.

(10) Patent No.: US 8,915,456 B2
(45) Date of Patent: Dec. 23, 2014

(54) ERGONOMIC TORCH REGULATOR CONTROLLER

(75) Inventors: Thomas A. Burdsall, Huntersville, NC (US); Chris S. Leyden, Cornelius, NC (US); Gregory David Parker, Charlotte, NC (US); Jeffrey P. Stark, Davidson, NC (US)

(73) Assignee: Worthington Torch, LLC, Columbus, OH (US)

( * ) Notice: Subject to any disclaimer, the term of this patent is extended or adjusted under 35 U.S.C. 154(b) by 553 days.

(21) Appl. No.: 13/245,225

(22) Filed: Sep. 26, 2011

(65) Prior Publication Data

US 2012/0074244 A1 Mar. 29, 2012

Related U.S. Application Data (60) Provisional application No. 61/386,668, filed on Sep. 27, 2010.

(51) Int. Cl.
| | | |
|---|---|---|
| *B05B 1/10* | (2006.01) | |
| *B23K 3/02* | (2006.01) | |
| *F23D 14/46* | (2006.01) | |
| *F23N 1/00* | (2006.01) | |

(52) U.S. Cl.
CPC ............ *B23K 3/022* (2013.01); *F23N 2041/11* (2013.01); *F23N 2035/24* (2013.01); *F23D 14/465* (2013.01); *F23N 1/007* (2013.01)
USPC ........................................ 239/581.1; 239/569

(58) Field of Classification Search
CPC ...... B05B 1/3013; B05B 1/302; B05B 1/3046
USPC .................... 239/581.1, 525, 526, 569, 582.1
See application file for complete search history.

(56) References Cited

U.S. PATENT DOCUMENTS

| 4,552,124 | A | | 11/1985 | Nakajima | |
|---|---|---|---|---|---|
| 5,021,624 | A | * | 6/1991 | Rogers et al. | 219/70 |
| 5,622,672 | A | * | 4/1997 | Swick et al. | 266/48 |
| 5,803,061 | A | | 9/1998 | Kao | |
| 2003/0168493 | A1 | | 9/2003 | Hirano et al. | |
| 2010/0021854 | A1 | | 1/2010 | Kotani | |

FOREIGN PATENT DOCUMENTS

FR 2 446 441 8/1980

OTHER PUBLICATIONS

International Search Report of corresponding International Application No. PCT/US2011/053431—Dated Dec. 16, 2011.
Written Opinion of the International Searching Authority of corresponding International Application No. PCT/US2011/053431—Dated Dec. 16, 2011.
International Preliminary Report on Patentability of corresponding International Application No. PCT/US2011/053431—Dated Dec. 16, 2011.
EPO Communication pursuant to Article 94(3) EPC in Corresponding EP Application No. 11 768 234.4; dated Jul. 10, 2014; p. 1-4.

* cited by examiner

*Primary Examiner* — Davis Hwu
(74) *Attorney, Agent, or Firm* — Hasse & Nesbitt LLC; W. Charles Ehlers; Daniel F. Nesbitt (57) ABSTRACT

A torch assembly having features enabling single handed operation. The torch assembly includes a flame control device that can be operated with a user's fingers while the user is holding the torch with the same hand. A controller apparatus of the torch assembly includes a trigger for actuating an on/off valve adapted to permit or stop flow through a fuel line, a regulator adapted to at least partially restrict flow in the fuel line and including a regulator valve, and a controller operatively connected to the regulator to adjust the position of the valve to vary the flow of fuel through the fuel line. The controller is interposed between the trigger and the regulator, and can include a rotatably mounted knob.

18 Claims, 7 Drawing Sheets

INSTALL VALVE CORE, O-RING, PISTON, SPRING, BONNET, AND JAM NUT

FIG. 11

INSTALL INTAKE STEM ASSEMBLY, D-RING CGA600 BUSHING, AND GASKET.

FIG. 10

REGULATOR BLOCK

FIG. 9

INSTALL SEAL-SCREW
FIG. 13

INSTALL VALVE CORE, SPRING, O-RING, ACTUATOR, AND SNAP RING
FIG. 12

FIG. 16 INSTALL ORIFICE ASSEMBLY AND/OR FILTER, INSTALL BURNTUBE O-RING

FIG. 15 SET AND ADJUST REGULATOR PRESSURE WITH SPLINED COLLAR, INSTALL OUTER KNOB

FIG. 14

ERGONOMIC TORCH REGULATOR CONTROLLER

RELATED APPLICATIONS

This application claims priority under 35 U.S.C. §119(e) to U.S. Provisional Application Ser. No. 61/386,668 filed Sep. 27, 2010, which is expressly incorporated by reference herein.

FIELD OF THE DISCLOSURE

The present exemplary embodiment relates generally to a torch design that provides control of a flame, and more particularly to an ergonomic controller of a flame regulator. However, it is to be appreciated that the present exemplary embodiment is also amenable to other like applications.

BACKGROUND

Torches are used in various applications for applying localized intense heat. One such application is pipe soldering. Pipe soldering involves joining together components such as two pipes or fittings through the application of solder to the joint. To flow solder into the joint, a torch is used to heat the joint and/or solder directly until the solder reaches its melting point. Once the solder becomes a liquid, it then flows into the joint and, upon cooling, joins and seals the components together.

It will be appreciated that controlled application of heat to the joint is often desirable. A user of a conventional torch can control the application of heat by moving the torch into and out of proximity to the joint such that the joint experiences intermittent heating until a desired level of heating is achieved. Another way to manage the application of heat is through adjusting the size of the torch flame. Soldering a pipe, however, typically requires a person to use a first hand to hold the torch and a second hand to hold the solder. To safely adjust the torch flame, a user must set down the solder and use the second hand to manipulate a knob or other device configured to control the flame. This can be inconvenient and can decrease worker efficiency. Moreover, a user may be tempted to adjust the flame without setting down the solder which can present a safety hazard.

BRIEF DESCRIPTION

Embodiments described herein allow the user to hold the torch and adjust the flame with the same (single) hand during operation, such as during a soldering operation, thus eliminating the need for the user to set the solder down to adjust the flame, and/or reducing unsafe conditions that may exist should a user attempt to adjust the flame without setting down the solder. More generally, aspects of the disclosure provide a more user friendly torch designed for single handed operation.

In accordance with one aspect, a torch assembly adapted to be attached to an associated fuel supply comprises a housing, a fuel line at least partially contained within the housing, a burn tube extending from the housing and adapted to receive fuel from the fuel line, an attachment member operatively connected to the housing for connecting the torch assembly to a fuel supply, the attachment member in fluid communication with the fuel line for delivering fuel from the associated fuel supply to the fuel line, and a control apparatus at least partially supported within the housing and configured to control the flow of fuel through the fuel line. The control apparatus includes a trigger for actuating an on/off valve adapted to permit or stop flow through the fuel line, a regulator adapted to at least partially restrict flow in the fuel line, and a controller operatively connected to the regulator to adjust the position of the regulator to vary the flow of fuel through the fuel line. The controller is interposed between the trigger and the regulator.

The controller can include a rotatably mounted knob. The housing can include a lower pistol grip portion having a contoured gripping surface and an upper portion including the trigger, and the rotatably mounted knob can be disposed between the trigger and the lower pistol grip portion of the housing. The position of the knob can permit operation of the controller with a person's hand while the hand is gripping the lower pistol grip portion of the housing. The trigger can be located in spaced relation to a longitudinal axis of the lower pistol grip portion of the housing, and the knob can be located between the longitudinal axis of the lower pistol grip portion of the housing and the trigger. The regulator can include a regulator valve. The knob can be coextensive with at least a portion of the lower pistol grip portion of the housing. The lower pistol grip portion can be adapted to fit in a person's hand, wherein the trigger is adapted to be activated by the person's trigger finger, and wherein the knob is positioned to be manipulated by the person's thumb.

The knob can be rotatable about an axis generally perpendicular to a longitudinal axis of the lower pistol grip portion of the housing. The knob can be supported within the housing and can protrude from at least two sides of the housing such as, for example, opposite sides of the housing. The regulator can include a piston type regulator. The assembly can further include a trigger lock operative to lock the on/off valve in an on position. An igniter can be operably connected to the trigger.

In accordance with another aspect, a control apparatus for an associated torch assembly comprises a trigger for actuating an on/off valve adapted to permit or stop flow of fuel through a fuel line of the associated torch assembly, a regulator adapted to at least partially restrict flow in the fuel line of the associated torch assembly and including a regulator valve, and a controller operatively connected to the regulator to adjust the position of the regulator valve to vary the flow of fuel through the fuel line of the associated torch assembly. The controller is interposed between the trigger and the regulator.

The controller can include a rotatably mounted knob. The regulator can include a piston type regulator. A trigger lock operative to lock the on/off valve in an on position can be provided. The regulator, regulator valve and/or on/off valve can be included in a common valve body. The control apparatus can be installed as a unit in the associated torch assembly. An igniter can be operably connected to the trigger.

DETAILED DESCRIPTION

Figure 1:
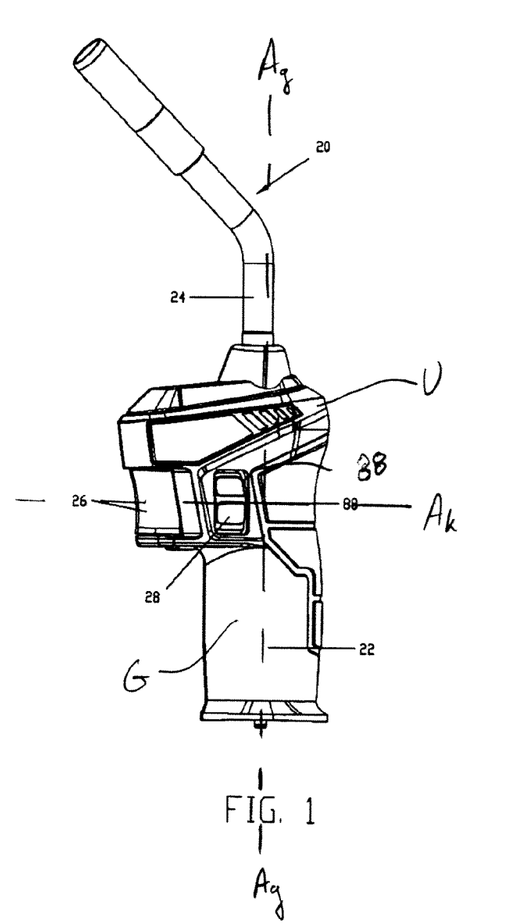
FIG. 1 is a side elevation view of an exemplary torch assembly in accordance with the disclosure.
Figure 2:
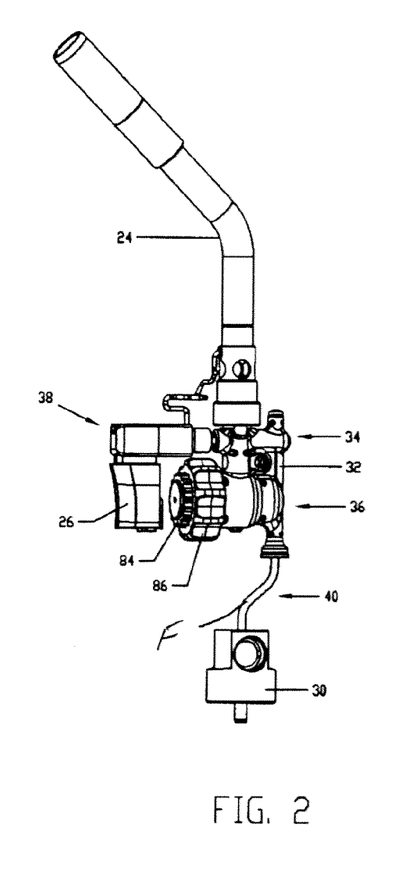
FIG. 2 is a side elevation view of the torch assembly of FIG. 1 with portions thereof removed to expose otherwise concealed components.
Figure 3:
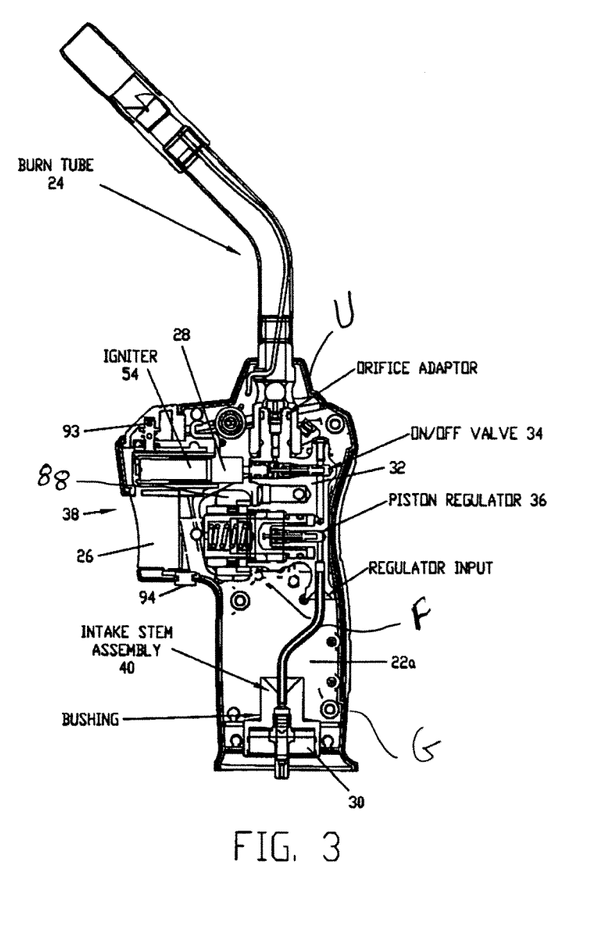
FIG. 3 is a cross-sectional view of the torch assembly of FIG. 1.
Figure 4:
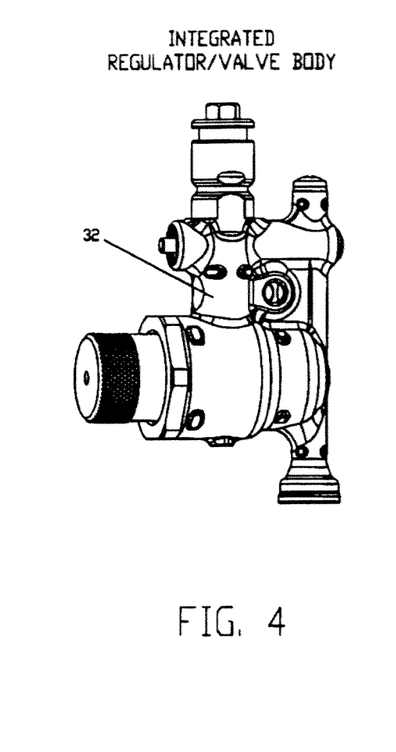
FIG. 4 is a perspective view of an exemplary integrated regulator/valve body in accordance with the disclosure.
Figure 5:
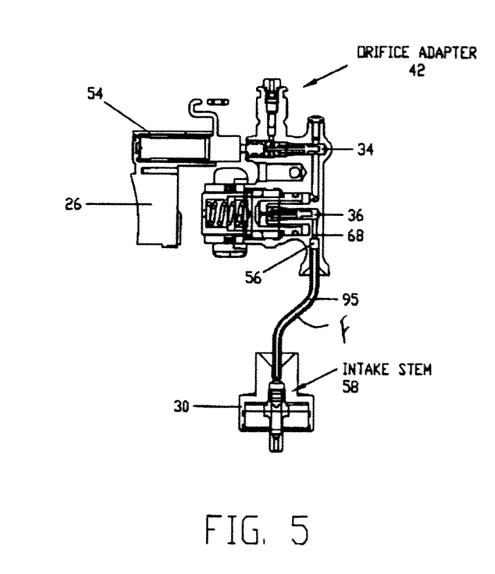
FIG. 5 is a cross-sectional view of the integrated regulator/valve body of FIG. 4.
Figure 6:
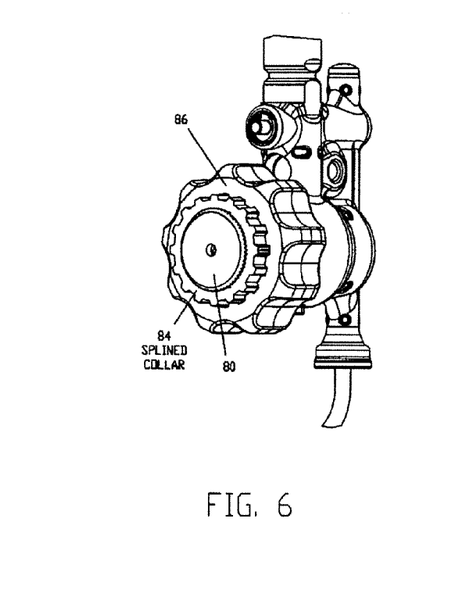
FIG. 6 is a perspective view of the integrated regulator/valve body including the outer knob.
Figure 7:
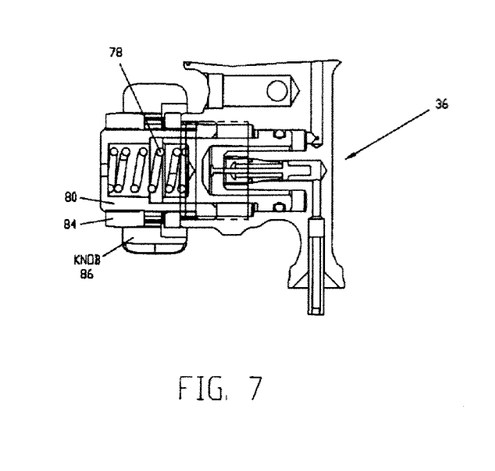
FIG. 7 is a cross-sectional view of the integrated regulator/valve body of FIG. 6.
Figure 8:
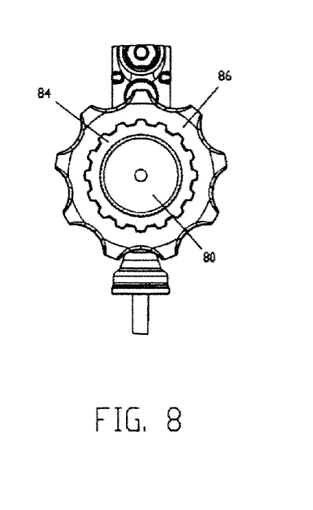
FIG. 8 is a front elevational view of the integrated regulator/valve body.

An exemplary embodiment of a torch assembly 20 in accordance with the present disclosure is shown in FIGS. 1-3 and includes a housing 22 made of die cast metal such as steel, or plastic, to form a handle. The housing 22 includes a lower pistol grip portion G configured to be grasped by a user. The grip portion G may have a suitable profile so as to comfortably fit within a palm of a user's hand. The housing 22 also includes an upper portion U that includes a trigger 26 and a control knob 28 for adjusting the flow of fuel through the torch assembly to control the torch flame. A burn tube 24 extends upwardly from the housing 22. These components are visible on the exterior of the torch assembly 20 as shown in FIG. 1.

FIGS. 2 and 3 show the internals of the torch assembly 20 in perspective and partial cross-section views, respectively. As will be appreciated, the torch assembly is configured to be attached to a gas cylinder tank or other source of fuel. Gas, such as propane or propylene, is delivered from the tank (not shown) located beneath the housing 22. An attachment member, in this case a threaded bushing 30, which may be, for example, a CGA 600 bushing, allows an empty tank to be removed and replaced with a full tank. Alternatively, a quick connect coupler could be used to provide more a rapid tank exchange.

Figure 12:
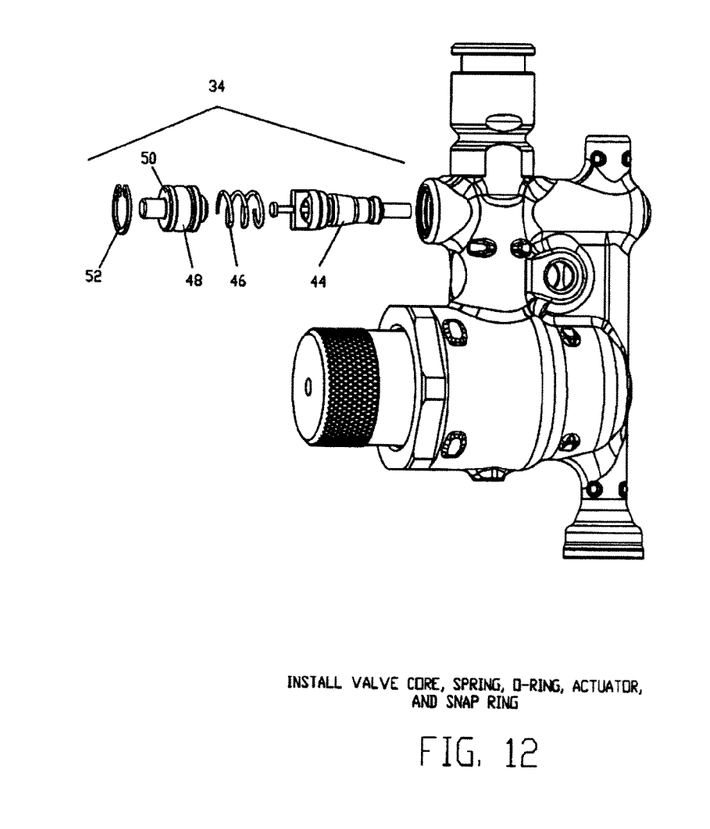
FIG. 12 is an exploded view of at least some of the on/off valve components.
Figure 13:
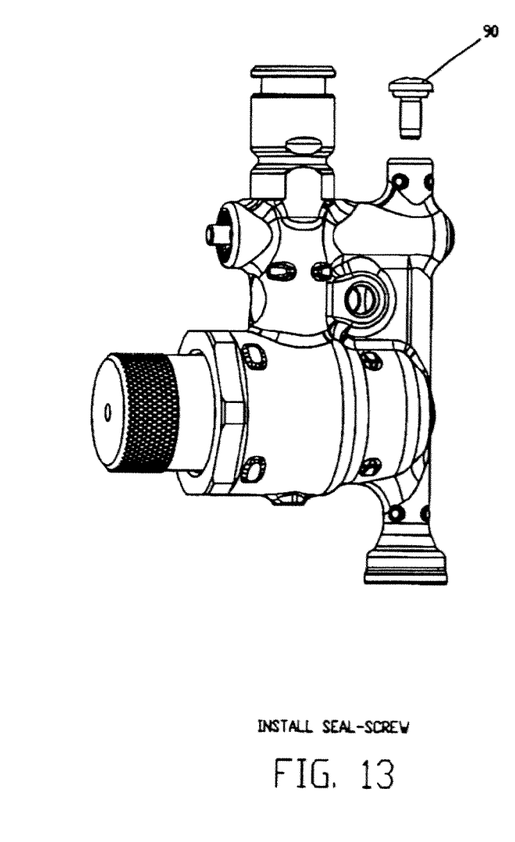
FIG. 13 is another view of the regulator block illustrating installation of a seal screw.

The housing 22 may be provided in two halves 22a that mate to enclose many of the components of the torch assembly including the bushing 30, an integrated valve and regulator body 32, an on/off valve 34, a regulator 36, a trigger assembly 38, an intake stem assembly 40, an orifice adapter 42 for connection to the burn tube 24, a continuous run lock button 93, and a trigger lockout button 94. FIGS. 3 and 12 show the on/off valve, which includes a valve core 44, spring 46, o-ring 48, actuator 50, and snap ring 52. To release fuel into the burn tube 24, the valve 34 is actuated by pushing the trigger 26. When the trigger 26 is depressed, the valve 34 is opened to allow the fuel to flow into the burn tube 24 under pressure, subject to any restriction to flow provided by the regulator 36. The spring 46 returns the valve 34 to the closed position and the trigger 26 to the extended position when the trigger 26 is released.

The trigger assembly 38 includes an igniter 54, which may be, for example, a piezoelectric igniter that is also actuated by the trigger 26. When the trigger 26 is depressed a spark is created in the burn tube 24 simultaneously with, or just after, the flow of gas through the burn tube 24. Trigger lockout button lock 94 is provided to mechanically lock the trigger 26 in the depressed position to allow "hands free" operation of the torch 20 such that the torch 20 will produce a flame without the user having to continually depress the trigger 26.

Figure 10:
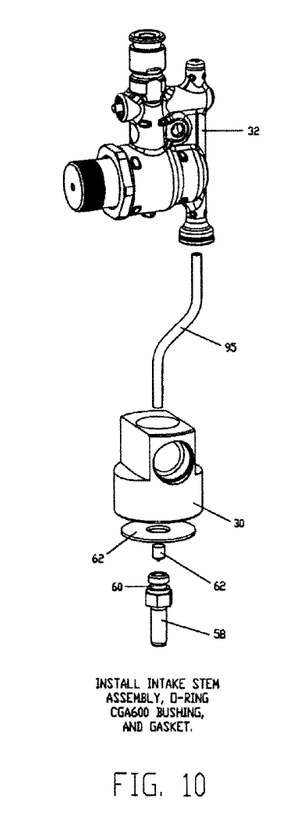
FIG. 10 is an assembly view of the integrated regulator/valve body and intake stem in accordance with the disclosure.

The intake stem assembly 40 is provided at the lower end of the housing 22. An extension tube 95 of the intake stem assembly 40 is brazed or otherwise connected to the integrated valve and regulator body 32 at the regulator input 56 and to the bushing 30 as shown in FIG. 10. The intake stem 58 is mounted to the bushing 30 with an O-ring 60, a filter 62, and a gasket 66.

Figure 11:
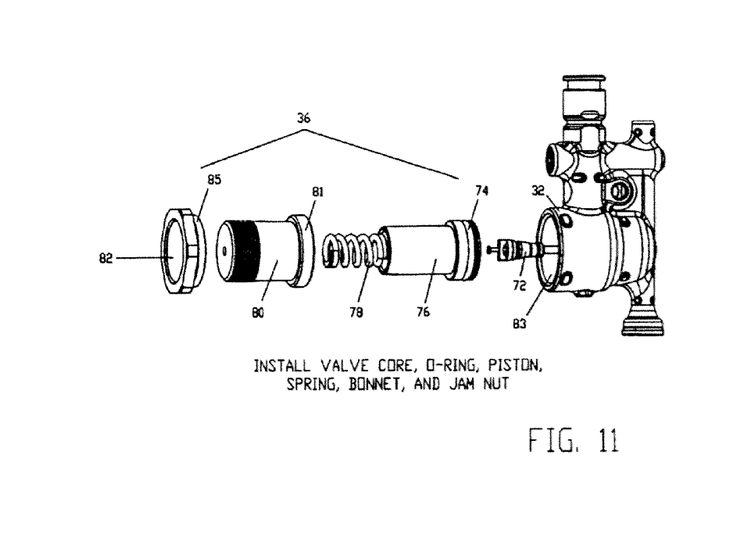
FIG. 11 is an assembly view of the valve components of the regulator valve.

The regulator 36, which is a piston-type valve in the embodiment shown, controls the flow of gas through a fuel supply line 68. The regulator includes a valve assembly disposed in the integrated valve and regulator body 32. FIG. 11 shows that the regulator 36 includes a valve core 72, an O-ring 74, a piston 76, a spring 78, a bonnet 80, and a jam nut 82. A lubricant, such as a silicon-based lubricant, may be applied to the o-ring 74, for example, silicone lubricants offered by 3M, Molykote® offered by Dow Corning, Krytox® offered by Loctite, and anti-sieze lubricants offered by Loctite. The regulator 36 and the on/off valve 34 may be the same type of valves as shown, or may be different types and sizes of valve as selected by one of ordinary skill in the art.

At one end 81 of the bonnet 80, which has a larger diameter than the body of the bonnet 80, external threads are provided. At the large opening 83 of the regulator body 32, internal threads are provided. The bonnet 80 is screwed into the regulator body opening 83. The bonnet's threading interfaces with the regulator body's threading to determine the spring 78 position. The spring position applies force on the piston 76 through compression. This force applied to the piston determines the pressure of the internal gas required to open the valve 72. The jam nut 82 is passed over the bonnet 80 and the smaller end 85 of the jam nut 82 is screwed into the regulator body opening 83 to prevent withdrawal of the bonnet 80 from the regulator body 32.

As shown in FIGS. 6-8, 15, and 16, in one embodiment a splined collar 84 is press fitted around the bonnet 80 of the regulator 36, which has a knurled outer surface. A knob 86 is slid over the splined collar 84 and is exposed through an aperture 88 (FIG. 1 and FIG. 3) in one or both sides of the housing 22. The knob 86 may be, for example, plastic or brass. When the knob 86 is rotated, most likely with a person's thumb and forefinger, the splined collar 84 rotates and the bonnet 80 turns with the splined collar 84. The knob 86, splined collar 84, and bonnet 80 actuate the regulator valve. When the bonnet 80 rotates in one direction, the piston 76 of the regulator 36 is pressed to open the valve, and when the bonnet 80 rotates in the other direction, the piston withdraws, allowing the valve to close. If desired, the valve could be configured to close when pressed. There is a small spring (not visible) in the valve 72 that provides return force to the piston 76. The position of the knob 86 along its axis of rotation $A_k$ is held constant, while the splined collar 84 travels within the knob 86 along the axis $A_k$ and the bonnet 80 travels with the splined collar 84. The degree to which the valve is open corresponds to the position of the splined collar and bonnet.

The orifice adapter 42 may be configured to work with ½-inch thin wall tubing and brass venturis, and may allow burn tube-installed and other orifices.

Turning back to FIG. 1, it will be appreciated that in the illustrated embodiment the knob 28 is rotatable about the axis $A_k$ extending from left to right. This axis is generally perpendicular to a longitudinal axis $A_g$ of the lower pistol grip portion G of the housing 22. In addition, it will be observed that the trigger 26 is located forward of the longitudinal axis $A_g$ of the lower piston grip portion G, with the knob 28 being between the trigger 26 and such axis. In this embodiment, the knob 28 is coextensive with the lower pistol grip portion G of the housing and set slightly forward of said longitudinal axis $A_g$. In this position, the knob 28 is easily accessible to a finger of a person's hand while holding the torch.

Figure 9:
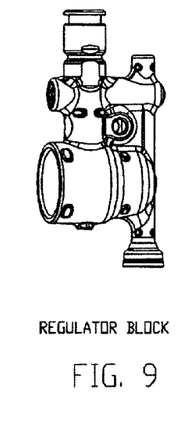
FIG. 9 is a perspective view of an exemplary regulator block in accordance with the disclosure.
Figure 14:
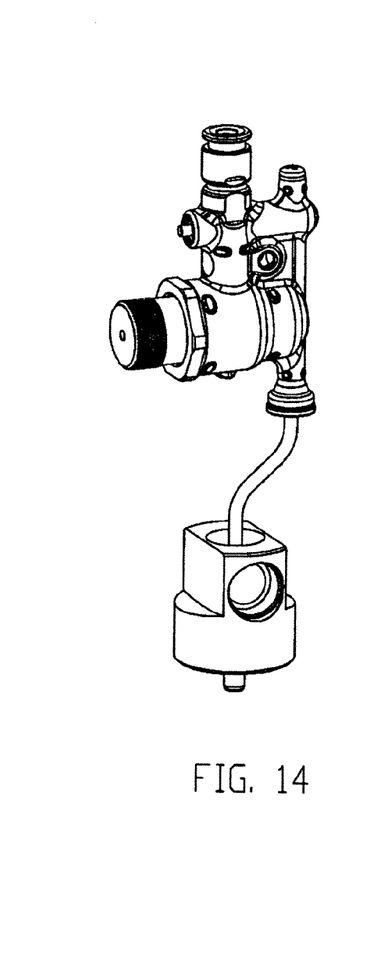
FIG. 14 is a perspective view of the regulator block and intake stem in accordance with the exemplary embodiment.

One embodiment of a method of manufacturing the on/off valve 34 and regulator 36 is shown in FIGS. 9-16. The integrated valve and regulator body 32, or the regulator block, is shown in FIG. 9. FIGS. 10 and 14 show the installation of the intake stem assembly 40 and parts to seal to the bushing 30 as described above. FIG. 11 shows the assembly of the regulator 36, as described above. FIG. 12 shows the assembly of the on/off valve 34, also as described above. A seal screw 90 is installed in FIG. 13.

Figure 15:
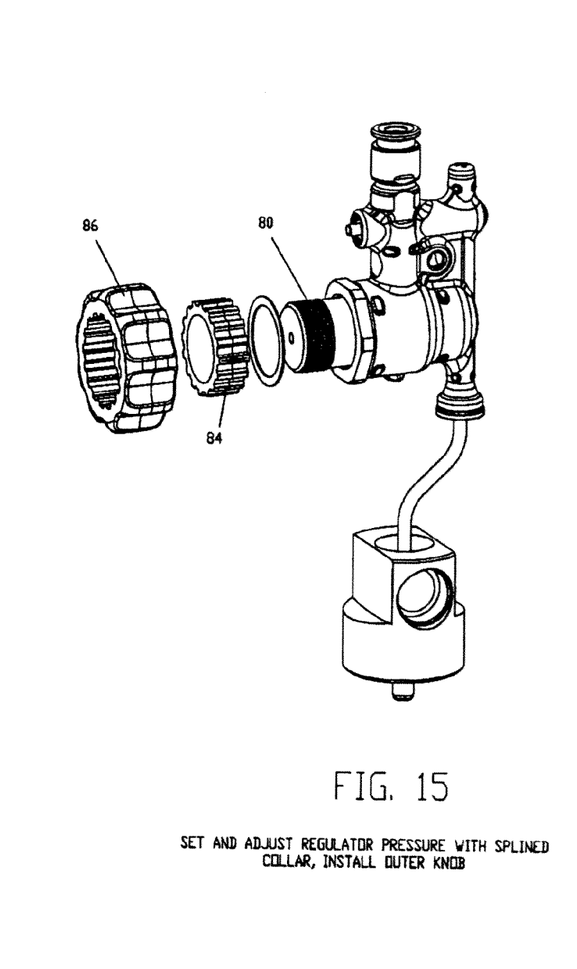
FIG. 15 is a perspective assembly view of the installation of the knob on the regulator block.
Figure 16:
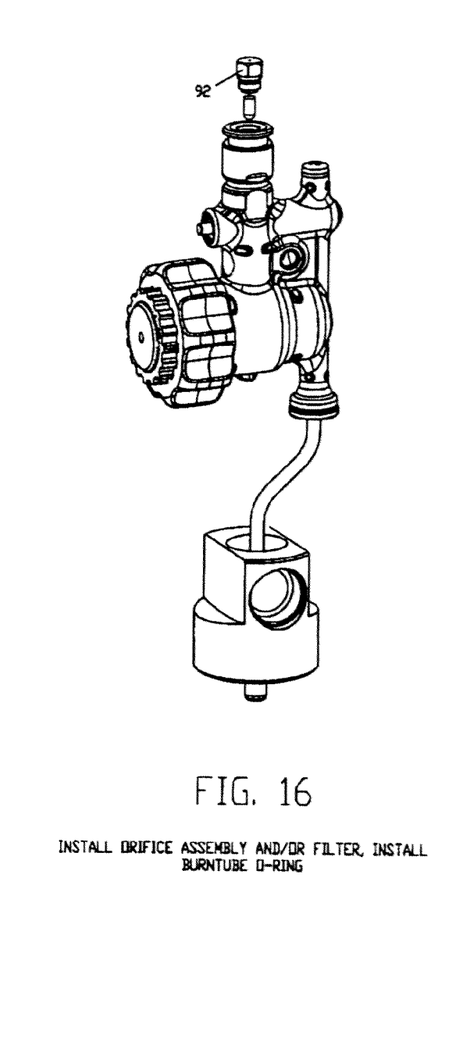
FIG. 16 is a perspective view of the knob installed on the regulator block.

In FIG. 15 the splined collar 84 is added over the bonnet 80 and the outer knob 86 is added over the splined collar 84. The assembled integrated valve and regulator is shown in FIG. 16, with the orifice assembly 92, and the burn tube 24 may be installed as shown in FIG. 1.

The integrated valve and regulator body may instead be provided as two separate components, one for the on/off valve and one for the regulator.

Putting a rotating knob or wheel between the trigger and regulator provides an ergonomic location for an adjustment device for the flame. Locations other than that shown for the adjustment device could be used and remain within the spirit and scope of the ergonomic torch regulator control knob described herein. The described piston regulator for adjusting the pressure of the gas improves control over the flame as compared to the traditional needle valve flow restrictor, though the traditional valve and arrangement could be used.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A torch assembly adapted to be attached to an associated fuel supply, the torch assembly comprising: a housing; a fuel line at least partially contained within the housing; a burn tube extending from the housing and adapted to receive fuel from the fuel line; an attachment member operatively connected to the housing for connecting the torch assembly to the associated fuel supply, the attachment member in fluid communication with the fuel line for delivering fuel from the associated fuel supply to the fuel line; and a control apparatus at least partially supported within the housing and configured to control the flow of fuel through the fuel line; wherein the control apparatus includes: a trigger for actuating an on/off valve adapted to permit or stop flow through the fuel line; a regulator adapted to at least partially restrict flow in the fuel line; and a controller operatively connected to the regulator to adjust the position of the regulator to vary the flow of fuel through the fuel line; wherein the controller is interposed between the trigger and the regulator; wherein the housing includes a lower pistol grip portion having a contoured gripping surface and an upper portion including the trigger, and wherein the controller is disposed between the trigger and the lower pistol grip portion of the housing, the position of the controller permitting operation of the controller with a person's hand while the hand is gripping the lower pistol grip portion of the housing; and wherein the trigger is located in spaced relation to a longitudinal axis of the lower pistol grip portion of the housing, and wherein the controller is located between the longitudinal axis of the lower pistol grip portion of the housing and the trigger.

2. A torch assembly as set forth in claim 1, wherein the controller includes a rotatably mounted knob.

3. A torch assembly as set forth claim 1, wherein the controller is coextensive with at least a portion of the lower pistol grip portion of the housing.

4. A torch assembly as set forth in claim 1, wherein the lower pistol grip portion is adapted to fit in a person's hand, wherein the trigger is adapted to be activated by the person's trigger finger, and wherein the controller is positioned to be manipulated by the person's thumb.

5. A torch assembly as set forth in claim 2, wherein the knob is rotatable about an axis generally perpendicular to a longitudinal axis of the lower pistol grip portion of the housing.

6. A torch assembly as set forth in claim 2, wherein the knob is supported within the housing and protrudes from at least two sides of the housing.

7. A torch assembly as set forth in claim 6, wherein the knob protrudes from opposite sides of the housing.

8. A torch assembly as set forth in claim 1, wherein the regulator includes a piston regulator.

9. A torch assembly as set forth in claim 1, further comprising a trigger lock operative to lock the on/off valve in an on position.

10. A torch assembly as set forth in claim 1, wherein the regulator includes a regulator valve.

11. A torch assembly as set forth in claim 1, further including an igniter operably connected to the trigger.

12. A control apparatus for an associated torch assembly comprising: a trigger for actuating an on/off valve adapted to permit or stop flow of fuel through a fuel line of the associated torch assembly; a regulator adapted to at least partially restrict flow in the fuel line of the associated torch assembly and including a regulator valve; and a controller operatively connected to the regulator to adjust the position of the regulator valve to vary the flow of fuel through the fuel line of the associated torch assembly; wherein the controller is interposed between the trigger and the regulator; wherein the housing includes a lower pistol grip portion having a contoured gripping surface and an upper portion including the trigger, and wherein the controller is disposed between the trigger and the lower pistol grip portion of the housing the position of the controller permitting operation of the controller with a person's hand while the hand is gripping the lower pistol grip portion of the housing; and wherein the trigger is located in spaced relation to a longitudinal axis of the lower pistol grip portion of the housing, and wherein the controller is located between the longitudinal axis of the lower pistol grip portion of the housing and the trigger.

13. A control apparatus as set forth in claim 12, wherein the regulator includes a piston regulator.

14. A control apparatus as set forth in claim 12, further comprising a trigger lock operative to lock the on/off valve in an on position.

15. A control apparatus as set forth in claim 12, wherein the regulator and regulator valve are housed in a common valve body.

16. A control apparatus as set forth in claim 12, wherein the regulator, regulator valve, and on/off valve are housed in a common valve body.

17. A control apparatus as set forth in claim 12, wherein the controller includes a rotatably mounted knob.

18. A control apparatus as set forth in claim 12, further including an igniter operably connected to the trigger.

* * * * *